T. KOPINSKI.
GEAR TEETH CALIPERS.
APPLICATION FILED MAY 3, 1915.

1,156,694.

Patented Oct. 12, 1915.

Inventor
T. Kopinski

By N. W. Wilson

Attorney

UNITED STATES PATENT OFFICE.

THOMAS KOPINSKI, OF ROCHESTER, NEW YORK.

GEAR-TEETH CALIPERS.

1,156,694.   Specification of Letters Patent.   Patented Oct. 12, 1915.

Application filed May 3, 1915.   Serial No. 25,489.

*To all whom it may concern:*

Be it known that I, THOMAS KOPINSKI, a subject of the Emperor of Germany, residing at Rochester, in the county of Monroe and State of New York, have invented certain new and useful Improvements in Gear-Teeth Calipers, of which the following is a specification.

This invention relates to certain new and useful improvements in gear teeth calipers.

The primary object of the present invention is to provide a double-reading measuring instrument for calculating the depth, breadth and span of gear teeth although the device is capable of measuring any short distances within the limits of the device, the readings being readily made from both a diametral and a metric scale, by "diametral" being understood a scale for laying out gear teeth to the commonly used diametral pitch.

It is further designed to provide a caliper of simple and cheap construction having an adjustably-mounted diametral scale mounted thereon while a corresponding metric scale is coöperatingly carried by the relatively shiftable caliper arms.

With these general objects in view and others that will appear as the nature of the invention is better understood, the same consists in the novel construction, combination and arrangement of parts to be hereinafter more fully described and then claimed.

Figure 1:
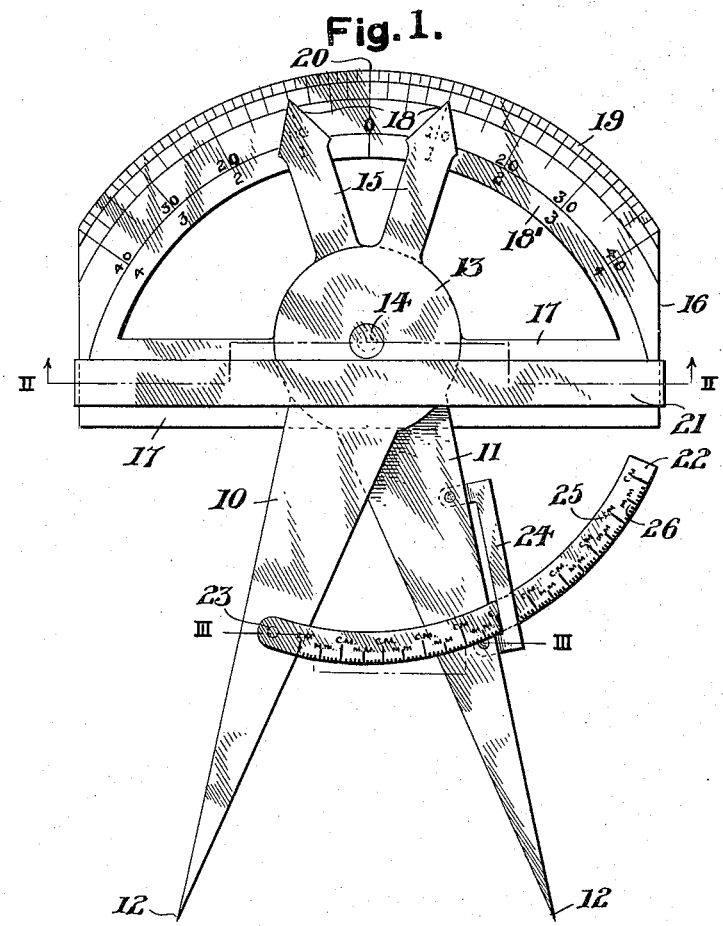
Figure 2:
Figure 3:
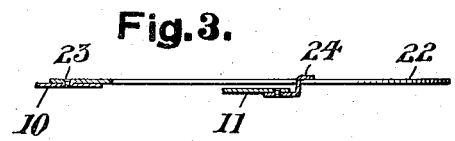

In the accompanying drawings forming part of this application and to which reference is had herein by like characters designating corresponding parts throughout the several views:—Figure 1 is a front elevation of the device. Fig. 2 is a transverse sectional view thereof upon line II—II of Fig. 1, and Fig. 3 is a similar sectional view upon line III—III of Fig. 1.

By referring to the drawings, it will be noted that similar caliper arms 10 and 11 are provided having pointed work-engaging ends 12 and oppositely-arranged disk heads 13, while the arms are pivoted together by means of a central rivet 14 extending through the said heads. The heads 13 are provided with projecting pointing or indicating fingers 15 in diametrical alinement with the arms 10 and 11.

A double quadrant-shaped scale plate 16 has its base 17 pivoted upon the rivet 14 at the rear of the arms 10 and 11 in such a manner that the pointer ends 18 of the fingers 15 will freely pass over the face of the scale plate 16. The said scale plate is provided with one inch markings 18' while the peripheral markings 19 denote eighths of an inch or diametral indications, it being seen that the readings increase in opposite directions from the zero line 20.

A protecting bar 21 is connected at its opposite ends to the rear side of the scale base 17 and at the opposite ends thereof and spans the arms 10 and 11 as well as the face of the scale base for the purpose of protecting the same.

A curved scale 22 is secured at one end as at 23 to the outer face of the overlying arm 10 and is slidably positioned through a U-shaped guide strap 24 carried by the other arm 11 of the caliper and in which manner the scale slides over the face of the caliper arm 11 and the readings upon the scale may be readily determined as indicated by the position of the strap 24. The scale 22 is provided with metric scale markings, the graduated divisions 25 thereof denoting centimeters and the shorter graduations 26 denoting millimeters. In measuring any distances with the present instrument, such as gear teeth, the points 12 of the arms 10 and 11 are accurately positioned upon the work and whereupon the pointers 18 will denote such distances in dimensions upon the scale plate 16, it being seen that the caliper is illustrated in Fig. 1 on the present drawings as indicating a distance of two inches. By referring to the ruler 22, the same distance may be instantly read in millimeters and centimeters, it being seen that in the present instance, the ruler 22 denotes a distance of 50.8 millimeters or 5.8 centimeters. It is to be noted that, by means of this construction the fingers 15 may be adjusted to lie equally spaced from the zero point of the scales on the quadrant.

The instrument may be readily employed in this manner for instantly and accurately measuring in both the diametral and metric systems in distances falling within the limit of the device, such measurements being readily readable by glancing at the respective scales upon the scale plate 16 and the ruler 22.

What I claim as new is:—

In combination, a pair of caliper arms provided with work-engaging ends and having oppositely disposed heads, a pivot connecting the heads, indicating fingers extending from the heads, and a segmental scale plate having its base pivotally mounted on the pivot and provided with a pair of arcuate scales over which the indicating fingers travel, said scales extending both directions from a central zero point.

In testimony whereof I affix my signature in presence of two witnesses.

THOMAS KOPINSKI.

Witnesses:
H. H. SIMMS,
ADA M. WHITMORE.

Copies of this patent may be obtained for five cents each, by addressing the "Commissioner of Patents, Washington, D. C."